Figure 1:
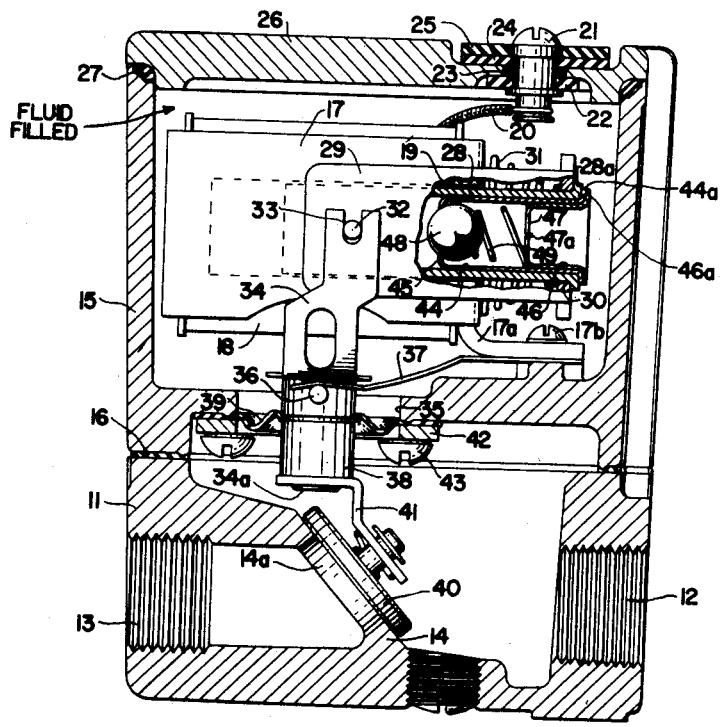

May 17, 1960

S. W. NICKELLS 2,936,997

SOLENOID VALVE

Filed Dec. 31, 1956

INVENTOR.
STANLEY W. NICKELLS

BY

*Glen M. Stanley*

ATTORNEY

# United States Patent Office 2,936,997
Patented May 17, 1960

2,936,997
SOLENOID VALVE

Stanley W. Nickells, Wayzata, Minn., assignor to Minneapolis-Honeywell Regulator Company, Minneapolis, Minn., a corporation of Delaware Application December 31, 1956, Serial No. 631,667

3 Claims. (Cl. 251—54)

This invention relates to solenoid valves and, more particularly, to a quiet operating solenoid valve which will provide quick initial opening of the valve followed by slow continued movement of the valve to its full open position. This invention is an improvement over the "Dampened Solenoid Valve Operator" of John R. Jamieson, Serial No. 507,552, filed May 11, 1955. In the Jamieson valve, the solenoid operator for the valve is enclosed in a chamber filled with oil, the oil serving as dampening means for the operation of the solenoid plunger. This invention makes use of the same type of dampening means but in addition thereto, provides a check valve arrangement wherein the plunger can move rapidly at first to give quick opening of the valve, for substantial fluid flow therethrough, and, thereafter, move on slowly to the end of its stroke, thus reducing the impact between the inner end of the plunger and the closed end of the solenoid tube, to reduce the noise level of the valve.

One of the objects of this invention is to produce a step opening solenoid gas valve which quickly opens to a position which assures ample fuel flow to a burner for ignition purposes, so as to prevent flashback, and then move on to its full open position at a slower rate so as to reduce the noise of impact between the plunger and the plunger stop.

Another object of the invention is to provide a quiet operating solenoid valve of inexpensive, yet of sturdy and of reliable construction.

A further object of the invention is to provide a solenoid actuator for gas valves that provides quick opening movement of a valve to a minimum flow position, followed by slow movement of the valve to its full open position.

Another object of the invention is to provide a valve arrangement, for use in solenoid plungers, which enables the solenoid plungers to move rapidly at first and thereafter move at a much slower rate to the end of their stroke.

Figure 2:
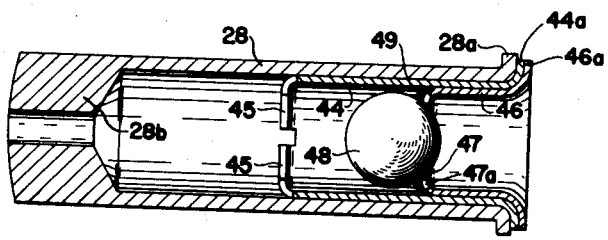

Further objects of the invention will become apparent upon reading the following detailed description of the invention in conjunction with the drawing wherein;

Figure 1 is a vertical sectional view along the longitudinal axis of the valve, with portions thereof broken away; and Figure 2 of the drawing is an enlarged sectional view of the solenoid plunger showing the check valve in the position it assumes after the valve has moved to its initial minimum flow position.

As the control device is substantially the same as the above mentioned Jamieson solenoid valve, except for the solenoid plunger construction, and, therefore, the valve and the actuating means between the solenoid plunger and the valve is not a part of this invention, except in the overall combination, the parts of the invention which are old will be only briefly described.

The control device consists of a valve body 11 having a threaded inlet 12, a threaded outlet 13 with an apertured wall 14 therebetween, and a solenoid housing 15 sealingly clamped over the open top of the valve body, with a gasket 16 therebetween, by means of bolts (not shown).

A yoke 17 of magnetic material is secured, by means of a bracket 17a and bolts 17b, within the housing 15. A solenoid coil 18 is located between the sides of yoke 17 and a solenoid plunger tube 19, extending between the ends of the yoke, with the coil surrounding the tube. The coil is connected through leads 20 to terminals 21 that, in turn, extend through insulation and sealing plates 22, 23, 24, and 25 in a cover 26. The cover is secured to the housing 15, with an O-ring seal 27 therebetween, by means of bolts (not shown).

A solenoid plunger 28 of cylindrical construction and of magnetic material, has an annular flange 28a around its outer end and an inwardly thickened portion 28b at its inner end. A generally U-shaped yoke 29 has an opening 30 therein of the same diameter as the outside diameter of the plunger 28 so that the two parts are securely held together by a pressed fit or by any other suitable means. This yoke straddles the plunger with the flange 28a of the plunger bearing against the base portion of the yoke around the opening 30. A helical spring 31 is positioned between the solenoid coil yoke 17 and the U-shaped yoke 29 carried by the solenoid plunger, to normally bias the yoke and plunger outwardly of the solenoid tube. Pins 32 extend outwardly from the inner ends of the legs of the yoke 29 and into slots 33 of a Y-shaped actuating lever 34.

The lever 34 is rockably mounted at the inner edge of an aperture 35 through the bottom of the housing 15 on a pivot 36. The pivot rests in grooves (not shown), in the bottom of the housing 15 and is held in these grooves by means of a leaf spring 37 that is clamped to the bottom of the housing 15 by means of the bracket 17a and bolts 17b. The lever has a sleeve extension portion 38 that is clamped to a sealing diaphragm 39 by means of a reduced-diameter portion 34a of the lever that extends through the diaphragm, the extension 38 and a lever arm 41 and is headed over below the arm. A valve 40 is swivelly supported on an arm 41 by any suitable means.

The outer edge of the sealing diaphragm 39 is clamped to the under surface of the bottom wall of the housing 15 by means of a sealing ring 42 and bolts 43.

To enable the solenoid to operate quietly and to enable it to move rapidly at first and thereafter to move slowly to the end of its stroke, with the plunger end in engagement with the closed end of the solenoid tube, the chamber within the housing 15 is filled with a suitable fluid, such as oil. Also, a check valve having a cylindrical body portion 44 is secured within the plunger tube 28 by means of a pressed fit or by any other suitable means. This body portion has inwardly extending fingers 45 forming wide radial slots or bleed passages therebetween at its inner end, and has a cup-shape member 46 in its outer end. The member has an outwardly flanged portion 46a that bears against an outwardly flanged portion 44a of the check valve body 44. The member 46 also has an inwardly flanged portion 47 with small radial slots or bleed passages 47a cut therein for a purpose to be presently described. A ball valve 48 is located within check valve body 44 and between the fingers 45 and the flange 47. A helical compression spring 49 normally biases the valve 48 into engagement with the fingers 45 but is yieldable to permit the flow of oil outwardly through the plunger to carry the ball valve against the bias of spring 49 into engagement with the flange 47.

It is thus seen that with the solenoid plunger fitting quite snugly in the bore of the plunger tube, fluid must pass through the plunger tube in order for the plunger to move inwardly thereof. As the space or bleed passage between the fingers 45 on the inner end of the check valve are quite large, oil can at first flow rapidly between the fingers and out the open end of the plunger tube. However, the ball valve 48 is carried by this flow of oil and moves against the bias of spring 49 into engagement with the flange 47 which forms a valve seat at the outer end of the solenoid plunger. Thereafter, oil flow must be through the very small slots or bleed passages 47a which results in slower movement of the plunger through the rest of its stroke.

Obviously, the check valve could be placed anywhere in the plunger and a valve member other than of ball-shape could be used in the check valve unit.

By proper selection of the strength of the spring 49, the size of the slots 47a, the distance between the fingers 45 and flange 47, and the number of these slots, it is obvious that the speed with which the plunger may move inwardly of the solenoid tube and the distance that it may move rapidly may be regulated. It is also obvious that the distance that the plunger moves inwardly in its initial movement determines the amount that the U-shaped yoke will rock the lever for actuating the valve and thus controls the minimum open position that the valve will reach rapidly.

Once the solenoid has been energized and the valve has moved rapidly to its minimum flow position and thereafter moved to its full open position, the pressure on the opposite sides of the flange 47a will tend to equalize and the ball 48 will then be biased away from this flange and into seating engagement with the fingers 45. Then upon de-energization of the solenoid, the plunger can move rapidly throughout its stroke to quickly close the valve, as there will be substantially no restriction to oil flow through the slots 47a only.

As modifications may be made in the above described preferred embodiment of the invention without departing from the spirit of the invention, the scope of the invention is to be determined from the appended claims.

I claim as my invention:

1. In a gas valve, the combination comprising a control valve movable between closed and open positions, a fluid filled chamber, a solenoid tube in said chamber and having a closed end and an open end, a coil of wire surrounding said tube, a hollow plunger extending partly into said tube at its open end, means for normally biasing said plunger outwardly of said tube, said plunger being operably connected to said valve, and a check valve in said plunger, said check valve having a ball therein biased towards a first seat having large radially extending slots forming bleed passages therethrough and being movable to a second seat having smaller radially extending slots forming bleed passages therethrough, said slots being spaced apart a distance about twice the diameter of said ball so that said plunger may initially move rapidly into the tube until fluid flow through the plunger moves the ball to the seat having the smaller bleed passages therein so as to quickly move the control valve partly open and thereafter to reduce the plunger speed to cause the control valve to move slowly to its full open position.

2. A gas valve comprising a control valve movable between closed and open positions, a fluid filled chamber, a solenoid tube in said chamber and having a closed end and an open end, a coil of wire surrounding said tube, a hollow plunger extending partly into said tube at its open end, means for normally biasing said plunger outwardly of said tube, said plunger being operably connected to said valve, and a check valve in said plunger, said check valve being formed of two nested cup-shaped members of unequal depth and having a valve therein biased towards a first seat formed in one of said members and having a large bleed passage therethrough and being movable to a second seat formed in the other of said members and having a smaller bleed passage therethrough, said seats being spaced apart a substantial distance so that said plunger may initially move rapidly into the tube a predetermined distance until fluid flow through the plunger moves the valve to the seat having the smaller bleed passage therein so as to partially open said control valve quickly and thereafter to reduce the plunger speed to cause the control valve to move slowly to its full open position.

3. In a gas valve, the combination comprising a control valve movable between closed and open positions, a fluid filled chamber, a solenoid tube in said chamber and having a closed end and an open end, a coil of wire surrounding said tube, a hollow plunger extending partly into said tube at its open end, means for normally biasing said plunger outwardly of said tube, said plunger being operably connected to said valve, and a check valve in said plunger, said check valve having a valve therein biased towards a first seat having a large bleed passage therethrough and being movable to a second seat having a smaller bleed passage therethrough, said seats being spaced apart a substantial distance so that said plunger may initially move rapidly into the tube until fluid flow through the plunger moves the valve to the seat having the smaller bleed passage therein so as to partially open said control valve quickly and thereafter to reduce the plunger speed to cause the control valve to move slowly to its full open position.

References Cited in the file of this patent
UNITED STATES PATENTS

| | | |
|---|---|---|
| 851,999 | Skellenger | Apr. 30, 1907 |
| 879,472 | Keller | Feb. 18, 1908 |
| 1,552,375 | Ainsworth | Sept. 1, 1925 |
| 1,730,688 | Rippl | Oct. 8, 1929 |
| 2,358,999 | Ray | Sept. 26, 1944 |
| 2,457,681 | Keating et al. | Dec. 28, 1948 |
| 2,496,638 | Ray | Feb. 7, 1950 |
| 2,740,074 | Griffes et al. | Mar. 27, 1956 |